July 14, 1942.    L. S. PETERSEN    2,290,068
SLURRY DRYING
Filed Dec. 5, 1940
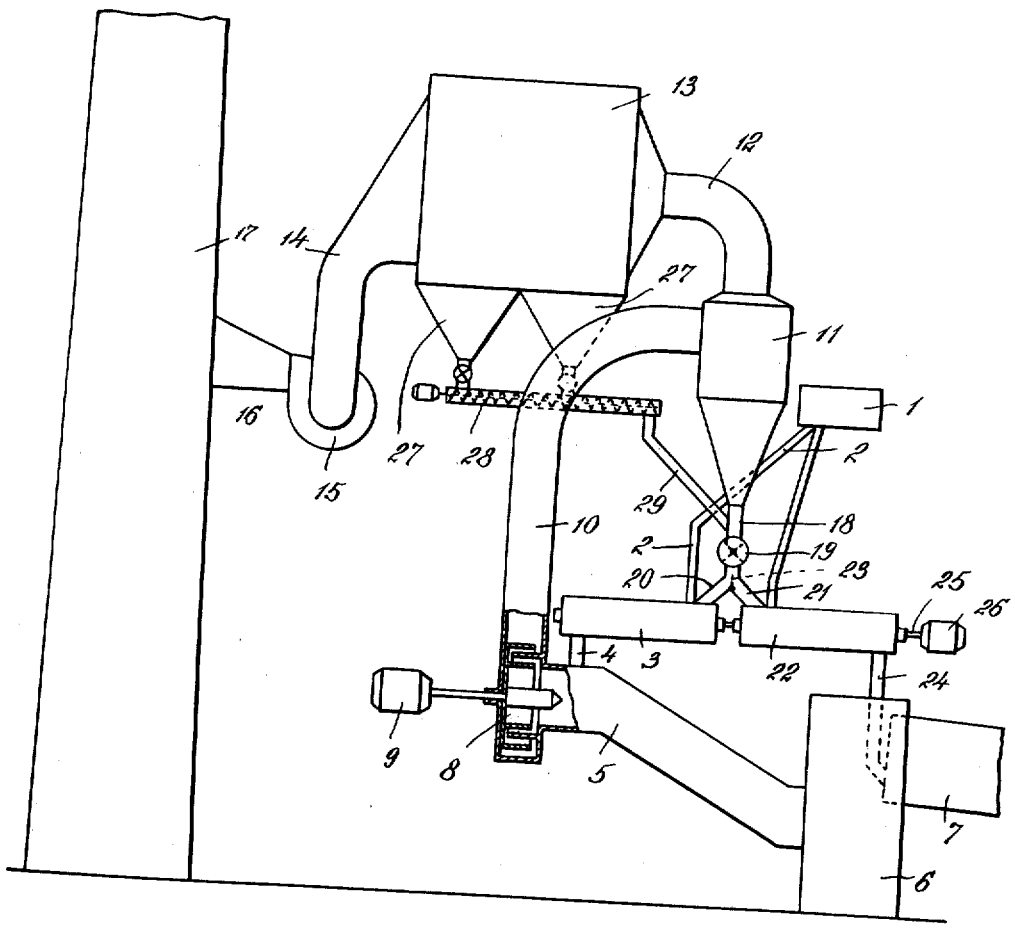
INVENTOR
Louis S. Petersen
BY
Pennie Davis Marvin Edmonds
ATTORNEYS Patented July 14, 1942

2,290,068

UNITED STATES PATENT OFFICE 2,290,068

SLURRY DRYING

Louis S. Petersen, Forest Hills, N. Y., assignor to F. L. Smidth & Co., New York, N. Y., a corporation of New Jersey Application December 5, 1940, Serial No. 368,740

9 Claims. (Cl. 263—53)

This invention relates to the manufacture of cement and is concerned more particularly with a novel method of preparing cement raw material slurry for burning in a kiln and an apparatus by which that method may be advantageously practised.

Cement raw material slurry may be fed directly to a rotary kiln and dried in the upper end of the kiln by the hot gases from the clinkering zone but that operation is wasteful unless the kiln is equipped with efficient heat transfer elements in the drying zone and is of sufficient length to permit the calcining and clinkering to be carried on efficiently beyond the drying zone. Even then, kiln employed must be very long and such a kiln is expensive to construct. Accordingly, various attempts have been made to reduce the water content of the slurry before it is introduced into the kiln by evaporation and it has also been proposed to remove some of the moisture from the slurry mechanically, the latter operation resulting in the production of a filter cake.

Reduction of the moisture content of the slurry by evaporation is not satisfactory because the material becomes too dusty and does not handle well in the kiln. The mechanical method is objectionable because the heat transfer elements developed for use in ordinary wet kilns are not adapted for use in connection with filter cake and, therefore, much of the advantage resulting from the lower moisture content of the filter cake is lost.

It is well known that cement raw material may be calcined and clinkered most effectively in a rotary kiln when the material is in the form of nodules and the advantage of operating on the material in that form is so pronounced that, in some instances, materials which are in dry form are nodulized because of the ease with which nodular material may be treated. Such nodules form automatically below the heat transfer elements in long wet kilns, but do not form readily from slurry dried in the devices heretofore employed for drying purposes nor from filter cake. Accordingly, when slurry which has had its moisture content reduced by evaporation or mechanical means is burned, the failure of the material thus treated to produce nodules results in a loss in economy.

The present invention is directed to the provision of a method by which the moisture content of cement raw material slurry may be reduced and the material converted into a form which permits efficient calcining and clinkering in a rotary kiln. In the practise of the method, the product produced is of such water content as to be suitable for immediate introduction into the kiln and it is in nodular form, unless the characteristics of the slurry are such as to make nodulization difficult or imposible. In the latter event, the product has the consistency of moist earth.

According to the new method, raw slurry is mixed with previously dried slurry in regulated proportions and this mixture is then dried. Part of the dried product is then used for mixing with additional raw slurry to produce the mixture to be dried, while the remainder is mixed with raw slurry in regulated proportions to produce a second mixture suitable for delivery into the kiln. In the second mixing operation, nodules may be formed and by regulating the proportions of the dried and the raw slurry acted on in the two mixing operations, the final product is one in which the moisture content has been substantially reduced and which has a form such that it may be efficiently burned.

For a better understanding of the invention, reference may be had to the accompanying drawing in which the single figure is a view, partly in elevation and partly in section, of one form of apparatus by which the new method may be efficiently practised.

In the apparatus illustrated, the raw slurry is supplied to a feeder 1 from which a pipe 2 leads to a mixing device 3. This device may be any suitable mixing apparatus, for example, a pug mill, a nodulizing drum, etc. A discharge pipe 4 leads from the mixing device 3 into a duct 5 leading from the housing 6 of a rotary kiln 7. The duct 5 leads to a suitable disintegrating apparatus 8 driven by a motor 9 and a duct 10 leads from the disintegrator to a cyclone separator 11. From the top of the separator, the gases flow through a duct 12 to a dust collector 13 from which a duct 14 leads to a fan 15, the outlet of which is connected by a duct 16 to a stack 17.

From the bottom of the separator 11, a pipe 18 leads to a feeder 19 from which a pipe 20 leads to the mixing device 3 and a pipe 21 leads to a mixing device 22. The relative quantities of material flowing through the pipes 20 and 21 are determined by any suitable means, such as a distributing plate 23 subdividing the stream issuing from the feeder 19. The mixer 22 is preferably of such construction as to produce nodules and a pipe 24 leads from the mixer through the housing 6 and discharges into the kiln 7. The mixers 3 and 22 are illustrated as provided with a common shaft 25 driven by a motor 26, but the devices may be separately driven, if desired.

The dust separator 13 has a pair of hoppers 27 at its lower end discharging into a screw conveyor 28 which delivers the dust through a pipe 29 connecting with the pipe 18.

In the operation of the apparatus, quantities of raw slurry from the feeder 1 and of previously dried slurry from the separator 11 are introduced into the mixer 3 and after being thoroughly mixed therein, the material issues from the mixer and flows through the pipe 4 into the duct 5. A stream of hot gases is caused to flow through the duct by the fan 15 and the mixed material is carried along in suspension in the gas stream to the disintegrator in which the material is broken up and reduced to finely divided form. The disintegrator employed is preferably of such construction that the moist material is not only disintegrated but simultaneously dried therein, and the material issuing from the disintegrator is carried along in suspension in the stream of hot gases through the duct 10 to the separator 11 where the solids are separated from the gases and collected in the bottom of the separator. During the disintegration and the conveyance of the material in suspension in the gas stream, the mixture is dried to the point where its free water content is reduced substantially to zero.

During the operations above described, raw slurry is being fed from the feeder 1 into the mixer 22, as is also dried slurry from the separator 11. In the mixer 22, the raw and dried slurry are mixed together to produce a mixture in which the moisture content is substantially below that of the raw slurry and the material is nodulized, if the characteristics of the slurry are such as to permit that treatment to be carried on. The product issuing from the mixer 22 and delivered into the kiln is suitable for burning.

As an illustration of the proportions of the feeds to the mixers, the following example may be given. To produce a ton of cement clinker, 1.2 tons of raw slurry containing 34% of moisture per ton of clinker are delivered from the feeder 1 to the mixer 3 while 2.6 tons of dried material having a zero moisture content are supplied through the pipe 20. Mixed together, these materials produce 3.8 tons of material containing 14% of moisture per ton of clinker to be produced. During th disintegration and conveyance of that mixture in suspension in the hot kiln gases to the separator 11, its moisture content is reduced substantiallly to zero. The material supplied to the mixer 22 consists of 0.4 ton of raw slurry containing 34% water per ton of clinker and 1.2 tons of the dried material delivered through the pipe 21. The mixture produced in mixer 22 then amounts to 1.6 tons of raw material containing 12% of water per ton of clinker.

If the characteristics of the slurry are such that it may be readily nodulized, both mixers 3 and 22 may be of such construction as to convert the mixed product into nodular form. The nodules issuing from mixer 3 are then disintegrated by the disintegrator 8 and the major part of the drying preferably takes place simultaneously with the disintegration. As the materials are then carried in suspension in the hot gas stream to the separator 11, the drying is completed by contact with the hot conveying gases. The nodules produced in the mixer 22 are supplied directly to the kiln. In case the slurry is such that it is difficult or impossible to produce nodules thereof, the mixers 3 and 22 may be of such construction as to produce a product having the consistencey of moist earth or some other suitable form.

I claim:

1. A method for continuously preparing slurry for burning which comprises continuously mixing raw slurry and previously dried slurry, drying the mixture to substantial dryness, continuously mixing a part of the substantially dry mixture with raw slurry in such proportions as to produce a second mixture in a form suitable for burning in a rotary kiln, and continuously utilizing the remainder of the substantially dry mixture for mixing with additional slurry to produce the mixture to be dried.

2. A method for continuously preparing slurry for burning which comprises continuously mixing raw slurry and previously dried slurry, disintegrating the mixture to substantial dryness, drying the disintegrated mixture, continuously mixing a part of the substantially dry mixture with raw slurry in such proportions as to produce a second mixture in a form suitable for burning in a rotary kiln, and continuously utilizing the remainder of the substantially dry mixture for mixing with additional slurry to produce the mixture to be dried.

3. A method of preparing slurry for burning which comprises mixing raw slurry and previously dried slurry, disintegrating the mixture, drying the disintegrated material, mixing the dried material with raw slurry to form a second mixture suitable for burning, and nodulizing the second mixture.

4. A method of preparing slurry for burning which comprises mixing raw slurry and previously dried slurry and producing a nodular mixture, disintegrating the mixture, drying the disintegrated material, and mixing the dried material with raw slurry to produce a nodular mixture suitable for burning.

5. A method of preparing slurry for burning in a kiln which comprises mixing raw slurry and previously dried slurry, introducing the mixture into a stream of hot exhaust gases from the kiln, the material being carried along in suspension in the stream and dried, separating the material from the gas stream, mixing part of the dried material with raw slurry to produce a mixture suitable for burning in the kiln, and utilizing the remainder of the dried material for mixture with the raw slurry to produce a mixture suitable for drying.

6. Apparatus for preparing slurry for burning in a kiln which comprises a container for dried slurry, a source of supply of raw slurry, a mixing device receiving dried slurry and raw slurry from the container and source, respectively, and mixing the dried and raw slurry, means for drying the mixture and delivering it to the container, a second device receiving dried and raw slurry from the container and source, respectively, and mixing the dried and raw slurry, and means for delivering the mixture produced in the second device to a kiln.

7. Apparatus for preparing slurry for burning in a kiln which comprises a container for dried slurry, a source of supply of raw slurry, a mixing device receiving dried slurry and raw slurry from the container and source, respectively, and mixing the dried and raw slurry, means for disintegrating the mixture, means for drying the disintegrated material and delivering it to the container, a second device receiving dried and raw slurry from the container and source, respectively, and mixing the dried and raw slurry, and means for delivering the mixture produced in the second device to a kiln.

8. Apparatus for preparing slurry for burning in a kiln, which comprises a container for dried slurry, a source of supply of raw slurry, a mixing device receiving dried and raw slurry from the container and source, respectively, and producing a mixture of the dried and raw slurry, a kiln, means for maintaining a stream of hot exhaust gases from the kiln, means for introducing the mixture into the gas stream to be carried along in suspension therein and dried, means for separating the dried material from the gas stream and delivering the material to the container, a second device for mixing raw slurry and dried slurry received from the source and container, respectively, and means for delivering the mixture produced in the second device to the kiln.

9. Apparatus for preparing slurry for burning in a kiln which comprises a container for dried slurry, a source of supply of raw slurry, a mixing device receiving dried and raw slurry from the container and source, respectively, and producing a mixture of the dried and raw slurry, a kiln, means for maintaining a stream of hot exhaust gases from the kiln, means for introducing the mixture into the gas stream to be carried along in suspension therein, a disintegrator through which the suspended material is passed and in which it is simultaneously disintegrated and dried, means for separating the dried material from the gas stream and delivering the material to the container, a second device for mixing raw slurry and dried slurry received from the source and container, respectively, and means for delivering the mixture produced in the second device to the kiln.

LOUIS S. PETERSEN.